Figure 1:
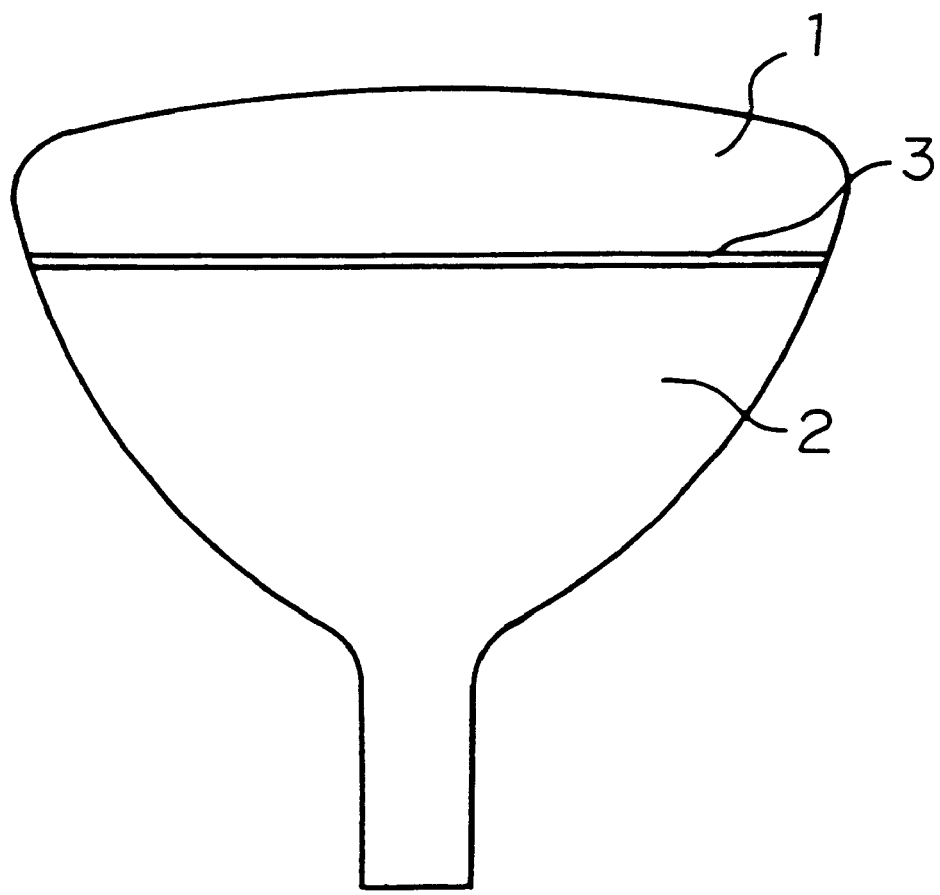

United States Patent

Sugawara et al.

Patent Number: 6,163,106
Date of Patent: Dec. 19, 2000

[54] COLOR CATHODE RAY TUBE AND WATER RESISTANT GLASS FRIT

[75] Inventors: Tsunehiko Sugawara; Yuichi Kuroki, both of Funabashi; Hirosi Usui, Yokohama; Ryuichi Tanabe, Yokohama; Tsuneo Manabe, Yokohama, all of Japan

[73] Assignee: Asahi Glass Company Ltd., Tokyo, Japan

[21] Appl. No.: 09/143,549

[22] Filed: Aug. 28, 1998

[30] Foreign Application Priority Data

Sep. 9, 1997 [JP] Japan .................................. 9-244399
Sep. 9, 1997 [JP] Japan .................................. 9-244400

[51] Int. Cl.⁷ .................................................. H01J 31/00
[52] U.S. Cl. .............................. 313/480; 501/17; 501/21; 428/426
[58] Field of Search ........................... 313/480; 501/15, 501/32, 41, 17, 16, 23; 428/426, 433

[56] References Cited

U.S. PATENT DOCUMENTS

| | | | |
|---|---|---|---|
| 5,346,863 | 9/1994 | Hikata et al. | 501/17 |
| 5,534,469 | 7/1996 | Hayashi | 501/15 |

FOREIGN PATENT DOCUMENTS

| | | |
|---|---|---|
| 53-51457 | 5/1978 | Japan . |
| 53-78048 | 7/1978 | Japan . |
| 54-7283 | 4/1979 | Japan . |
| 55-37507 | 9/1980 | Japan . |
| 60-46053 | 10/1985 | Japan . |
| 61-32272 | 7/1986 | Japan . |
| 61-261231 | 11/1986 | Japan . |
| 63-95137 | 4/1988 | Japan . |
| 2-8978 | 2/1990 | Japan . |
| 4-937 | 1/1992 | Japan . |
| 4-59637 | 2/1992 | Japan . |
| 4-214045 | 8/1992 | Japan . |
| 4-357132 | 12/1992 | Japan . |
| 5-105477 | 4/1993 | Japan . |
| 5-105480 | 4/1993 | Japan . |
| 5-97470 | 4/1993 | Japan . |
| 5-319863 | 12/1993 | Japan . |
| 6-227840 | 8/1994 | Japan . |
| 7-315867 | 12/1995 | Japan . |
| 8-26769 | 1/1996 | Japan . |
| 8-26771 | 1/1996 | Japan . |
| 8-59294 | 3/1996 | Japan . |
| 8-91870 | 4/1996 | Japan . |
| 8-91872 | 4/1996 | Japan . |
| 8-157234 | 6/1996 | Japan . |
| 8-231242 | 9/1996 | Japan . |
| 8-253344 | 10/1996 | Japan . |

OTHER PUBLICATIONS

Derwent Abstracts, AN 96–235780, JP 8091872, Apr. 9, 1996.

Derwent Abstracts, AN 96–235778, JP 8091870, Apr. 9, 1996.

Derwent Abstracts, AN 96–016954, JP 7291657, Nov. 7, 1995.

Derwent Abstracts, AN 78–55797A, JP 53072029, Jun. 27, 1978.

*Primary Examiner*—Michael H. Day
*Assistant Examiner*—Joseph Williams
*Attorney, Agent, or Firm*—Oblon, Spivak, McClelland, Maier & Neustadt, P.C.

[57] ABSTRACT

A color cathode ray tube having a panel glass and a funnel glass sealed with a composition comprising a low melting glass containing PbO as the main component, wherein the sealed portion is such that the weight reduction after being immersed in water at 90° C. for 20 hours, is at most 1 mg/cm², and the weight reduction after being immersed in a 10% nitric acid solution at 40° C. for 20 minutes, is from 80 to 700 mg/cm².

6 Claims, 1 Drawing Sheet

COLOR CATHODE RAY TUBE AND WATER RESISTANT GLASS FRIT

The present invention relates to a color cathode ray tube having a panel glass having a built-in shadow mask and an image display zone, and a funnel glass provided with a deflecting yoke coil and accommodating an electron gun, sealed with a composition containing a low melting glass frit as the main component, which is useful for a television receiver, a computer terminal display or the like, and a low melting glass frit suitable for use as a covering or sealing material.

In a color cathode ray tube, the envelope is constituted by a panel glass which supports a shadow mask for color selection and which serves as an image display portion, and a funnel glass which is located behind the panel glass and which supports a structure which provides a function of forming and scanning an electron beam.

In assembling a color cathode ray tube, high temperature heat treatment is carried out in a post process step such as an evacuation step. To be durable against the heat shock at that time and to maintain good airtightness, the panel glass and the funnel glass are sealed at a high temperature of about 440° C. by means of a low melting glass frit of PbO—$B_2O_3$—ZnO type which has a high PbO content and which is readily crystallizable.

Heretofore, a low melting glass frit having a composition of PbO—$B_2O_3$—ZnO type has often been used as a covering or sealing material. The low melting glass frit having such a composition is used particularly for sealing a panel glass and a funnel glass of a color cathode ray tube, or as various glazing agents.

On the other hand, with respect to PbO—$B_2O_3$—ZnO—$Bi_2O_3$ type glass having $Bi_2O_3$ incorporated, various types have proposed for sealing or other purposes.

JP-B-54-7283 discloses a glass composition for sealing, which comprises from 60 to 70 wt % of PbO, from 7 to 10 wt % of $B_2O_3$, from 13 to 16 wt % of ZnO, from 7 to 10 wt % of $Bi_2O_3$, from 0.5 to 1.5 wt % of $SiO_2$, from 0 to 3 wt % of BaO and from 0.5 to 3 wt % of $V_2O_5$.

JP-A-53-51457 discloses a crystallizable glass composition for thick film resistance coating, which comprises from 45 to 75 wt % of PbO, from 5 to 15 wt % of 203, from 5 to 20 wt % of ZnO and from 5 to 40 wt % of $Bi_2O_3$, wherein the total amount of PbO and $Bi_2O_3$ is from 2 to 85 wt %.

JP-A-53-78048 discloses a crystallizable glass composition for thick film resistance coating, which comprises from 45 to 70 wt % of PbO, from 5 to 15 wt % of $B_2O_3$, from 10 to 30 wt % of ZnO, from 5 to 35 wt % of $Bi_2O_3$ and from 2 to 10 wt % of $SnO_2$, wherein the total amount of PbO and $Bi_2O_3$ is from 62 to 85 wt %.

JP-B-60-46053 discloses a low melting sealing composition suitable for IC packaging, which comprises 68 wt % of PbO, 11 wt % of $B_2O_3$, 6 wt % of ZnO, 5 wt % of $Bi_2O_3$, 0.5 wt % $SiO_2$, 0.5 wt % of $Al_2O_3$ and 9 wt % of $PbF_2$.

JP-B-55-37507 discloses a glass composition for cadmium oxide glaze resistor, which comprises from 45.9 to 65 wt % of PbO, from 10.6 to 15 wt % of $B_2O_3$, from 7 to 10 wt % of ZnO and from 0.8 to 30 wt % of $Bi_2O_3$, from 3.5 to 5 wt % of $SiO_2$ and from 3 to 4.2 wt % of $Na_2O$.

JP-A-4-937 discloses a sealing glass composition which comprises from 76 to 82 wt % of PbO, from 8 to 11.5 wt % of $B_2O_3$, from 1 to 4 wt % of ZnO, from 5.5 to 8.5 wt % of $Bi_2O_3$, from 0.1 to 0.9 wt % of $SiO_2$ and from 0.1 to 0.9 wt % of $SnO_2$, wherein the total amount of PbO and $Bi_2O_3$ is from 84.5 to 87.5 wt %.

JP-A-63-95137 discloses a low melting sealing glass which comprises from 40 to 85 wt % of PbO, from 7 to 15 wt % of $B_2O_3$, from 0.5 to 7 wt % of ZnO, from 0 to 5 wt % of $Bi_2O_3$, from 0.5 to 5 wt % of $SiO_2$, from 0.5 to 3 wt % of $Cu_2O$, from 0 to 3 wt % of $Al_2O_3$ and from 2.5 to 7 wt % of F, wherein the molar ratio of $Cu_2O/F$ is less than 0.1.

JP-A-4-214045 discloses a sealing glass composition which comprises 50.7 wt % of PbO, 10.0 wt % of $B_2O_3$, 5.0 wt% of ZnO, 12.0 wt % of $Bi_2O_3$, 0.8 wt % of $SiO_2$, 0.5 wt % of $Al_2O_3$, 18.0 wt % of TeO and 3.0 wt % of $MoO_3$.

JP-A-4-357132 discloses a low melting sealing glass composition which comprises from 65.0 to 85.0 wt % of PbO, from 1.0 to 11.0 wt % of $B_2O_3$, from 1.0 to 15.0 wt % of $ZnO+Bi_2O_3+CuO$, from 0 to 5.0 wt % of $SiO_2+Al_2O_3$, from 0 to 5.0 wt % of $V_2O_5$, from 0 to 5.0 wt % of $SnO_2$, from 0 to 6.0 wt % of $F_2$ and from 0.2 to 10.0 wt % of $Fe_2O_3$.

JP-A-5-97470 discloses a low melting sealing glass composition which comprises from 70.3 to 92.0 wt % of PbO, from 1.0 to 10.0 wt % of $B_2O_3$, from 0 to 15.0 wt % of ZnO, from 5.2 to 20.0 wt % Of $Bi_2O_3$, from 0 to 2.0 wt % of $SiO_2$, from 0 to 2.0 wt % of $Al_2O_3$, from 0 to 2.0 wt % of $SnO_2$, from 0 to 4.0 wt % of BaO and from 0.01 to 8.0 wt % of $F_2$, wherein the $B_2O_3/PbO$ ratio is at most 0.11.

JP-A-5-105477 discloses a low melting sealing glass composition which comprises from 65.0 to 85.0 wt % of PbO, from 1.0 to 11.0 wt % of $B_2O_3$, from 0 to 11.0 wt % of ZnO, from 7.2 to 20.0 wt % of $Bi_2O_3$, from 0 to 3.0 wt % of $SiO_2+Al_2O_3$, from 0 to 5.0 wt % of $SnO_2$, from 0.2 to 5.0 wt % of CuO and from 0 to 4.0 wt % of $V_2O_5$ and from 0 to 6.0 wt % of $F_2$.

JP-A-5-105480 discloses a sealing composition which comprises from 70 to 80 wt % of PbO, from 5 to 12 wt % of $B_2O_3$, from 0 to 5 wt % of ZnO, from 3 to 12 wt % of $Bi_2O_3$, from 0 to 1 wt % of $SiO_2$, from 0 to 3 wt % of $Al_2O_3$, from 0 o 1 wt % of $SnO_2$, from 0.1 to 5.0 wt % of CuO, from 0.1 to wt % of $V_2O_5$ and from 0.1 to 3 wt % of F.

JP-A-5-319863 discloses a low melting sealing crystallizable glass powder which comprises from 65 to 85 wt % of PbO, from 1 to 17 wt % of $B_2O_3$, from 3 to 25 wt % of ZnO, from 0 to 20 wt % of $Bi_2O_3$, from 0 to 5 wt % of $SiO_2+Al_2O_3$, from 0 to 20 wt % of BaO and from 0 to 6 wt % of $F_2$.

JP-A-6-227840 (U.S. Pat. No. 5,346,863) discloses a low melting sealing glass composition which comprises from 45 to 75 wt % of PbO, from 0 to 11 wt % of $B_2O_3$, from 0 to 15 wt % of ZnO, from 20.1 to 45 wt % of $Bi_2O_3$, from 0 to 3 wt % of $SiO_2$, from 0 to 3 wt % of $Al_2O_3$, from 0 to 5 wt % of $SiO_2+Al_2O_3$, from 0 to 5 wt % of BaO, from 0 to 7 wt % of CuO, from 0 to 7 wt % of $Fe_2O_3$, from 0.1 to 10 wt % of $Fe_2O_3+CuO$, from 0 to 5 wt % of $TiO_2$, from 0 to 5 wt % of $ZrO_2$ and from 0 to 6 wt % of $F_2$.

JP-A-7-315867 discloses a low temperature sealing glass composition which comprises from 77 to 87 wt % of PbO, from 5 to 15 wt % of $B_2O_3$, from 0 to 10 wt % of ZnO, from 0 to 10 wt % of $Bi_2O_3$, from 0 to 4 wt % of $SiO_2$, from 0 to 2 wt % of $Al_2O_3$, from 0 to 2 wt % of BaO, from 0 to 4 wt % of $SnO_2$ and from 0 to 4 wt % of $V_2O_5$.

JP-A-8-26769 discloses a glass for bonding a magnetic head, which comprises from 65 to 77 wt % of PbO, from 2 to 8 wt % of $B_2O_3$, from 0 to 4 wt % of ZnO, from 0 to 10 wt % of $Bi_2O_3$, from 13.5 to 20 wt % of $SiO_2$, from 1 to 3 wt % of $Al_2O_3$, from 0 to 5 wt % of $SiO_2+Al_2O_3$, from 0 to 5 t% of BaO, from 0 to 10 wt % of $TeO_2$ and from 0.05 to 3 wt % of CuO.

JP-A-8-26771 discloses a glass for bonding a magnetic head, which comprises from 65 to 77 wt % of PbO, from 2 to 8 wt % of $B_2O_3$, from 0 to 4 wt % of ZnO, from 0 to 10 wt % of $Bi_2O_3$, from 13.5 to 20 wt % of $SiO_2$, from 1 to 3 wt % of $Al_2O_3$, from 0 to 10 wt % of $TeO_2$ and from 0.05 to 3 wt % of $Co_3O_4$.

JP-A-8-59294 discloses a low melting sealing glass composition which comprises from 0 to 44.9 wt % of PbO, from 1 to 20 wt % of B2O3, from 0 to 15 wt % of ZnO+CuO, from 45 to 90 wt % of Bi2O3, from 0 to 5 wt % of SiO2+Al2O3, from 0 to 10 wt % of CS2O, from 0 to 4 wt % of TeO2 and from 0 to 10 wt % of F2.

JP-A-8-91870 discloses a frit for CRT, which comprises from 65 to 85 wt % of PbO, from 4 to 15 wt % of B2O3, from 6.5 to 25 wt % of Bi2O3, from 1 to 10 wt % of ZnO, from 0.1 to 1.5 wt % of SiO2, from 0 to 0.1 wt % of Fe2O3 and from 1 to 8 wt % of Ag2O.

JP-A-8-91872 discloses a frit for CRT, which comprises from 65 to 78 wt % of PbO, from 4 to 15 wt % of B2O3, from 6.5 to 25 wt % of Bi2O3, from 1 to 10 wt % of ZnO, from 0.1 to 1.5 wt % of SiO2, from 0 to 2 wt % of Fe2O3 and from 1 to 8 wt % of Ag2O, wherein the total amount of Bi2O3 and ZnO is at least 15.5 wt %.

JP-A-8-157234 discloses a sealing glass composition which comprises from 25 to 88 wt % of PbO, from 1 to 20 wt% of B2O3, from 0 to 70 wt % of Bi2O3, from 0 to 20 wt % of ZnO, from 0 to 5 wt % of Fe2O3, from 0 to 5 wt % of CuO, from 0 to 5 wt % of V2O5, from 0.1 to 10 wt % of Fe2O3+CuO+V2O5, from 0 to 3 wt % of TiO2, from 0 to 5 wt % of Al2O3 and from 0 to 9 wt % of F2.

JP-A-8-253344 discloses a low temperature sealing glass composition which comprises from 60 to 85 wt % of PbO, from 3 to 12 wt % of B2O3, from 1 to 15 wt % of Bi2O3, from 2 to 15 wt % of ZnO, from 0 to 2 wt % of SiO2 and from 1 to 20 wt % of TeO2, wherein ZnO/TeO2 is from 0.3 to 2.

JP-A-8-231242 (U.S. Pat. No. 5,643,840) discloses a sealing glass composition which comprises from 25 to 85 wt % of PbO, from 1 to 11.2 wt % of B2O3, from 5.1 to 70 wt % of Bi2O3, from 0 to 15 wt % of ZnO, from 0 to 10 wt % of Fe2O3, from 0 to 10 wt % of CuO, from 0 to 5 wt % of SiO2, from 0.1 to 20 wt % of GeO2, from 0 to 5 wt % of TiO2 and from 0 to 9 wt % of F2.

When a defect is detected, for example, on a phosphor screen at the time of inspection after sealing of a color cathode ray tube, in order to correct the defective portion and to reuse the panel glass or the funnel glass constituting the envelope, it is necessary to divide the envelope into the panel glass and the funnel glass without damaging them. Heretofore, it has been common to employ a method wherein at least the sealed portion of the envelope is immersed in nitric acid having a concentration of from 5 to 12% to selectively dissolve a part of the low melting glass where the solubility in an acid is higher than the panel glass or the funnel glass, thereby to form a recess of about 1 mm all along the sealed portion, and then a heat cycle is applied to a such region to carry out the division by a thermal shock (hereinafter referred to as salvage).

In order to reduce environmental problems, it is important to facilitate such reuse of a cathode ray tube.

In recent years, in view of similar environmental problems, there is a trend to avoid incorporation of Pbo in industrial products as far as possible. Such a trend is also true with respect to low melting glass frit. However, PbO is an essential component to make a glass frit meltable at a low temperature. If the PbO content is reduced, it becomes difficult to obtain a glass frit which is capable of flowing at a low temperature and which is useful for sealing or covering.

It is an object of the present invention to solve the above mentioned problems and to provide a color cathode ray tube and a low melting glass frit having little environmental problems.

The present invention provides a color cathode ray tube having a panel glass and a funnel glass sealed with a composition comprising a low melting glass containing PbO as the main component, wherein the sealed portion is such that the weight reduction after being immersed in water at 90° C. for 20 hours, is at most 1 mg/cm$^2$, and the weight reduction after being immersed in a 10% nitric acid solution at 40° C. for 20 minutes, is from 80 to 700 mg/cm$^2$, and a water resistant glass frit consisting essentially of the following components:

| | |
|---|---|
| PbO | 50 to 70 wt %, |
| Bi$_2$O$_3$ | 5 to 40 wt %, |
| B$_2$O$_3$ | 5 to 15 wt %, |
| ZnO | 5 to 30 wt %, |
| SiO$_2$ | 0 to 10 wt %, |
| BaO | 0 to 5 wt %, |
| SrO | 0 to 5 wt %, |
| CaO | 0 to 5 wt %, |
| V$_2$O$_5$ | 0 to 0.5 wt %, | with a weight ratio of PbO/B2O3≦9, a weight ratio of ZsO/B2O3>1, a weight ratio of Bi2O3/B2O3>1, a weight ratio of PbO/Bi2O3≦8, and a weight ratio of Pbo/ZnO≦8.

Environmental problems are caused in many cases when the products are left to stand outdoors, and lead contained in the low melting glass of the sealed portion is eluted by water such as rain. Accordingly, the present inventors have paid a particular attention to the fact that the environmental problems can be reduced if the amount of such elution of lead in water can be suppressed, and the present invention has been finally accomplished.

With a PbO—B2O3—ZnO type glass which has heretofore been commonly used as a sealing glass frit, it is usually necessary to incorporate B2O3 to some extent in order to obtain a stable glass. However, according to the finding by the present inventors, if the content of B2O3 is increased, the water resistance of the glass decreases, and the amount of elution in water of lead contained in the glass, tends to increase. Accordingly, it is difficult to obtain a stabilized lead-containing glass and to suppress elution of lead contained in the glass simultaneously.

Besides, B2O3 has effects to reduce the thermal expansion coefficient of a lead-containing glass and to reduce the amount of a low expansion refractory filler powder which is incorporated to match the thermal expansion coefficient with the substrate or the object to be sealed. If the amount of the refractory filler powder is small, the fluidity during heating of the composition can be made high, whereby a coating film or sealed product having high strength can readily be obtained.

On the other hand, the present inventors have found that in order to facilitate the division into the panel glass and the funnel glass and to promote reuse of a cathode ray tube, the amount of elution in an acid of the low melting glass may be adjusted to be within a certain range. Namely, according to the present invention, the drawbacks of the prior art can be solved by suppressing the amount of elution of lead in water from the sealed portion between the panel glass and the funnel glass and by securing a proper degree of erosion of the sealed portion by an acid so that the division can be carried out without bringing about a damage.

The present inventors have found that by an addition of B2O3 to this glass and by balancing the respective components properly, it is possible to remarkably improve the water resistance of glass and to obtain a lead-containing glass having the solubility in an acid not deteriorated, in the presence of ZnO. Namely, it has been made possible to obtain a lead-containing glass having a small amount of elution of lead in water without substantially reducing the content of $B_2O_3$.

In the accompanying drawing, FIG. 1 is a side view of the color cathode ray tube of the present invention, wherein reference numeral 1 indicates a panel glass, numeral 2 a funnel glass, and numeral 3 a sealed portion between the panel glass and the funnel glass.

Now, the present invention will be described in further detail with reference to the preferred embodiments.

As it has a function of displaying images, a panel glass to be used for a color cathode ray tube contains no PbO which leads to a deterioration of image quality due to X-ray browning, and its composition is constituted by $SiO_2$ as the main component and SrO, BaO, etc., as other components. On the other hand, for a funnel glass, it is not required to take X-ray browning or the like into consideration, and PbO is incorporated in an amount of from about 21 to 24%, to increase the X-ray absorptivity. However, the funnel glass is chemically stable, and its water resistance is good at a level of from 0 to 0.1 $mg/cm^2$. Here, the water resistance being good, means that the weight reduction per unit area is small, when the funnel glass or a sintered body of a sealing composition, is immersed in deionized water at 90° C. for 20 hours.

On the other hand, the content of lead oxide in the low melting glass constituting the sealed portion usually tends to be high to make the glass low melting. Accordingly, to prevent an environmental problem due to elution of lead by the waste disposal or storage as exposed to rain, it is necessary to improve the water resistance. If the water resistance of the sealed portion deteriorates and the above mentioned weight reduction exceeds 1 $mg/cm^2$, it is likely that elution exceeds the regulated value for elution of lead relating to industrial wastes containing hazardous substances. Preferably, the weight reduction is at most 0.5 $mg/cm^2$.

As mentioned above, when the environmental problem is taken into consideration, it is important to reuse the panel glass and the funnel glass. The present invention is characterized also in that the weight reduction after immersing the sealed portion of a color cathode ray tube in a 10% nitric acid solution at 40° C. for 20 minutes, is from 80 to 700 $mg/cm^2$.

In the re-division into the panel glass and the funnel glass, the sealed portion is immersed in a nitric acid bath having a nitric acid concentration of from 5 to 12% at a liquid temperature of from 20 to 50° C. for at least 10 minutes to carry out defrit thereby to form a recess substantially uniformly all along the sealed portion. Control of the defrit amount is carried out by adjusting the liquid temperature or air bubbling. The depth of the recess by the defrit is at a level of from 0.5 to 1.5 mm.

Then, the outer surface of this glass bulb is immersed in or sprayed with warm water of from about 40 to 70° C. for from about 2 to 5 minutes to raise the temperature of the entire glass bulb. Further, cold water having a temperature lower by from 30 to 45° C. than the above warm water, is sprayed to let cracking start from the recess at which the stress concentrates. Then, the warm water is used again to give a heat shock to let cracking progress to carry out the division.

Accordingly, to carry out defrit of the sealed portion to selectively form a recess along the sealed portion, the acid-solubility of the sealed portion is required to be sufficiently larger than the acid-solubility of from 0 to 0.1 $mg/cm^2$ which the panel glass or the funnel glass has. Here, the acid-solubility is represented by the weight reduction per unit surface area, when the panel glass, the funnel glass or the sintered body of the sealed portion is immersed in 10% nitric acid at 40° C. for 20 minutes.

In such a re-division step, if the acid-solubility of the sealed portion is less than 80 $mg/cm^2$, it tends to be difficult to form a recess having an adequate depth. Consequently, effective cracking will not start from the recess at which the stress concentrates upon spraying with cold water, and at the time of the heat shock by the second temperature raising, breakage is likely to occur in the panel glass or the funnel glass in the vicinity of the sealed portion. Preferably, the acid-solubility is at least 110 $mg/cm^2$.

On the other hand, if the acid-solubility of the sealed portion exceeds 700 $mg/cm^2$, the etching speed tends to be too fast to form a recess uniformly. In such a case, control of the progressing direction on cracking tends to be difficult, whereby breakage of the panel glass or the funnel glass is likely to result. Preferably, the acid-solubility is at most 400 $mg/cm^2$.

As described above, by adjusting the acid-solubility of the sealed portion containing lead oxide as the main component within a range of from 80 to 700 $mg/cm^2$ and the water resistance of the sealed portion to at most 1 $mg/cm^2$, the re-division into the panel glass and the funnel glass upon detection of a defect after sealing, can be facilitated to make the re-use possible and to make it possible to improve the water resistance thereby to prevent an environmental problem due to elution of lead.

Now, a preferred embodiment will be described with respect to the construction of the sealed portion which satisfies both the water resistance and the acid-solubility of the sealed portion of the present invention. Firstly, the sealing composition to be used for the color cathode ray tube is preferably one consisting essentially of from 80 to 99.9 wt % of a low melting glass powder and from 0.1 to 20 wt % of a low expansion ceramic filler powder.

If the content of the low melting glass powder exceeds 99.9%, the amount of low expansion ceramic filler powder becomes small, whereby the thermal expansion coefficient tends to be too large, whereby consistency with the thermal expansion coefficient of the panel glass and the funnel glass tends to be lost, whereby the bulb strength will not be guaranteed. If the content is less than 80%, the glass component tends to be too small, whereby the fluidity tends to be poor, whereby the air tightness of the sealed portion tends to be impaired.

In the present invention, the low melting glass is meant for a glass having a softening point of at most 500° C., and the low expansion ceramic filler is meant for a ceramic filler having a thermal expansion coefficient of at most $70 \times 10^7 /°$ C. As the low expansion ceramic filler to be used for the sealing composition of the present invention, zircon, cordierite, alumina, mullite, lead titanate, silica, β-eucryptite, β-spodumene or β-quartz solid solution, is preferred from the viewpoint of the handling efficiency. These ceramic fillers may be used alone or in combination as a mixture of two or more of them. It is particularly preferred to use zircon as the low expansion ceramic filler, since the bond strength will be high.

Further, it is preferred that the low melting glass comprises PbO, $Bi_2O_3$, $B_2O_3$ and ZnO with a weight ratio of $ZnO/B_2O_3>1$ and a weight ratio of $Bi_2O_3/B_2O_3>1$. In the case of a weight ratio of $ZnO/B_2O_3 \leq 1$ or a weight ratio of $Bi_2O_3/B_2O_3 \leq 1$, the water resistance tends to be poor. When ZnO and $Bi_2O_3$ are present beyond predetermined amounts, they jointly serve to improve the water resistance. From this viewpoint, more preferred is a weight ratio of $ZnO/B_2O_3 \leq 1.2$. Further from the same viewpoint, more preferred is a weight ratio of $Bi_2O_3/B_2O_3 \geq 1.2$.

The sealing composition for a color cathode ray tube of the present invention is preferably such that the average thermal expansion coefficient within a range of from room temperature to 300° C. after firing is from $80 \times 10^{-7}$ to $110 \times 10^{-7}/°$ C. If the average thermal expansion coefficient of the sealing composition after firing within a range of from room temperature to 300° C., becomes outside the above range, a tensile stress will be exerted to the panel glass or the funnel glass after sealing, or to the sealed portion, whereby the strength of the cathode ray tube after sealing tends to be low.

In the present invention, it is preferred to employ a low melting glass which comprises PbO, $Bi_2O_3$, $B_2O_3$ and ZnO and which can be adequately fluidized at a relatively low temperature of from 400 to 480° C. in a relatively short period of time of from 5 to 45 minutes, so that the panel glass and the funnel glass can be sealed by a common process for assembling a color cathode ray tube. For example, it is preferred to employ a glass which consists essentially of the following components:

| | |
|---|---|
| PbO | 50 to 70 wt %, |
| $Bi_2O_3$ | 5 to 40 wt %, |
| $B_2O_3$ | 5 to 15 wt %, |
| ZnO | 5 to 30 wt %, |
| $SiO_2$ | 0 to 10 wt %, |
| BaO | 0 to 5 wt %, |
| SrO | 0 to 5 wt %, |
| CaO | 0 to 5 wt %, |
| $V_2O_5$ | 0 to 0.5 wt %, | with a weight ratio of $PbO/B_2O_3 \leq 9$, a weight ratio of $ZnO/B_2O_3 > 1$, a weight ratio of $Bi_2O_3/B_2O_3 > 1$, a weight ratio of $PbO/Bi_2O_3 \leq 8$, and a weight ratio of $PbO/ZnO \leq 8$.

The above glass powder is a water resistant glass frit of the present invention. This is a glass frit which is useful for sealing of a color cathode ray tube of the present invention. However, it can also be applied for sealing PDP (a plasma display panel) or for sealing VFD (a fluorescent display tube). Further, it can also be used for covering rather than sealing.

The components of the above mentioned water resistant glass frit of the present invention will be described in further detail. Hereinafter, "%" means "wt %" unless otherwise specified.

If the content of PbO is less than 50%, the softening point tends to be too high, whereby the merit of lead-containing glass, such that the fluidity during heating is good, will not be obtained. Accordingly, when it is used for sealing, the strength or air tightness of the sealed portion tends to be impaired, and when it is used for covering, baking at a low temperature tends to be difficult. The content is preferably at least 55%. If the content exceeds 70%, the softening point tends to be too low, whereby the heat resistance tends to be poor, and elution of lead from the glass to water tends to increase. The content is preferably at most 68%.

If the content of $Bi_2O_3$ is less than 5%, the effect for improving the water resistance tends to be inadequate. In order to obtain adequate water resistance, the content is preferably at least 8%. If the content exceeds 40%, the softening point tends to be so high that fluidity during heating tends to be poor. The content is preferably at most 38%, more preferably at most 30%.

$B_2O_3$ is an oxide for forming glass, and if its content is less than 5%, vitrification tends to be difficult. Preferably, the content is at least 6%. If its content exceeds 15%, the water resistance tends to be poor. The content is preferably at most 14%.

If the content of ZnO is less than 5%, it tends to be difficult to obtain a glass having high water Ad resistance, and the thermal expansion coefficient tends to be low. The content is preferably at least 7%. If the content exceeds 30%, devitrification is likely to occur during melting of the glass. The content is preferably at most 25%.

$SiO_2$ is not essential in the present invention. However, it may be incorporated to improve the heat resistance of the glass. Especially when the water resistant glass frit of the present invention is to be used for sealing, the heat resistance of the sealed portion can be improved by incorporating it in an amount of at least 0.5%. In such a case, it is preferred to incorporate it in an amount of at least 1%. However, if it exceeds 10%, the softening point tends to be too high, and the fluidity tends to deteriorate. It is preferably at most 5%, particularly preferably at most 4%.

BaO, CaO and SrO are not essential, but they may be incorporated to improve the meltability of the glass. However, when each of then exceeds 5%, the water resistance tends to be low, such being undesirable. Each of them is preferably at most 4%.

In the water resistant glass frit of the present invention, the content of $V_2O_5$ is at most 0.5%. Preferably, it is not substantially contained, since $V_2O_5$ tends to lower the water resistance. Likewise, $GeO_2$ is preferably not substantially contained.

Now, various weight ratios in the water resistant glass frit of the present invention will be described in detail.

In the composition of the water resistant glass frit of the present invention, the weight ratios of the respective components are important. Namely, the weight ratio of $PbO/B_2O_3 \leq 9$, the weight ratio of $ZnO/B_2O_3 > 1$, the weight ratio of $Bi_2O_3/B_2O_3 > 1$, the weight ratio of $PbO/Bi_2O_3 \leq 8$, and the weight ratio of $PbO/ZnO \leq 8$.

If the weight ratio of $PbO/B_2O_3 > 9$, the glass tends to be unstable, and the heat resistance tends to be low. From this viewpoint, preferred is the weight ratio of $PbO/B_2O_3 \leq 8$. On the other hand, the weight ratio of $PbO/B_2O_3 \geq 5$ is preferred. If the weight ratio of $PbO/B_2O_3 \geq 5$, the softening point tends to be high, and the fluidity tends to be inadequate.

If the weight ratio of $ZnO/B_2O_3 \leq 1$ or the weight ratio of $Bi_2O_3/B_2O_3 \leq 1$, the water resistance tends to be poor. In the present invention, ZnO and $Bi_2O_3$ together serve to improve the water resistance. From this viewpoint, preferred is the weight ratio of $ZnO/B_2O_3 \geq 1.2$. Likewise, preferred is the weight ratio of $Bi_2O_3/B_2O_3 \geq 1.2$.

On the other hand, it is preferred that the weight ratio of $ZnO/B_2O_3 \leq 8$. If the weight ratio of $ZnO/B_2O_3 > 8$, the fluidity tends to be poor at the time of heating the glass frit. From this viewpoint, more preferred is the weight ratio of $ZnO/B_2O_3 \leq 6$.

Further, it is preferred that the weight ratio of $Bi_2O_3/B_2O_3 \leq 8$. If the weight ratio of $Bi_2O_3/B_2O_3 > 8$, the fluidity likewise tends to be poor during the heating of the glass frit. From this viewpoint, more preferred is the weight ratio of $Bi_2O_3/B_2O_3 < 6$.

If the weight ratio of $PbO/Bi_2O_3 \geq 8$, or the weight ratio of $PbO/ZnO > 8$, the water resistance tends to be poor. From this viewpoint, preferred is the weight ratio of $PbO/Bi_2O_3 \leq 7$. Likewise, preferred is the weight ratio of $PbO/ZnO \leq 7$.

On the other hand, it is preferred that the weight ratio of $PbO/Bi_2O_3 \geq 1.5$. If the weight ratio of $PbO/Bi_2O_3 < 1.5$, the softening point tends to be high, and the fluidity tends to be low during the heating.

Further, it is preferred that the weight ratio of PbO/ZnO $\geq$ 1.5. If the weight ratio of PbO/ZnO<1.5, the softening point tends to be high, and the fluidity tends to be low during the heating.

The water resistant glass frit of the present invention is preferably such that the weight reduction after immersing it in water at 90° C. for 20 hours is at most 1 mg/cm$^2$. If the weight reduction exceeds 1 mg/cm$^2$, an environmental problem due to elution of lead is likely to result when such glass frit is used for the sealed portion of the color cathode ray tube. The weight reduction is more preferably at most 0.5 mg/cm$^2$.

The glass transition point of the water resistant glass frit of the present invention is at most 400° C. Accordingly, sealing can be carried out by maintaining the glass frit at a temperature of at least 400° C.

Depending upon the particular application, the water resistant glass frit of the present invention may contain fluorine. However, when the water resistant glass frit of the present invention is employed for electronic purposes, it is preferred that substantially no fluorine is contained. Namely, no more than unavoidable inclusion of fluorine as an impurity should be contained. This is intended to avoid an adverse effect of fluorine to e.g. an electron gun. Further, if fluorine is contained, the heat resistance is likely to be low.

Further, depending upon the particular application, the water resistant glass frit of the present invention may contain an alkali metal such as Na or K, or a metal having high electrical conductivity such as Ag. However, when it is used for electronic purposes, it is preferred that substantially no alkali metal such as Na or K, or no Ag, is contained. Because such an alkali metal or conductive metal is likely to deteriorate the insulation characteristic of the products.

Other elements may be contained so long as they do not impair the effects of the present invention. However, an extremely expensive element such as Te may better be not incorporated, particularly in an application where a low cost is required.

When the water resistant glass frit of the present invention is used for sealing, the sealing composition is preferably such that the content of the water resistant glass frit in the composition is within a range of from 60 to 99.9 wt %, and the total amount of the low expansion ceramic filler powder is within a range of from 0.1 to 40 wt %.

If the total amount of the low expansion ceramic filler powder exceeds 40 wt %, the fluidity at the time of sealing tends to be poor. If the total amount is less than 0.1 wt %, the amount of the low expansion ceramic filler powder is so small that the thermal expansion coefficient tends to be too large, whereby the thermal expansion coefficient tends to be inconsistent with the object to be sealed, whereby breakage is likely to result.

On the other hand, if the content of the water resistant glass frit is less than 60 wt %, the glass component tends to be small, whereby the fluidity tends to be poor, and air tightness of the sealed portion tends to be impaired. On the other hand, if its content exceeds 99.9%, the thermal expansion coefficient tends to be inconsistent with the object to be sealed, whereby the strength tends to be poor.

As the low expansion ceramic filler to be used for the above sealing composition, zircon, cordierite, alumina, mullite, lead titanate, silica, β-eucryptite, β-spodumene or β-quartz solid solution, is preferred from the viewpoint of the handling efficiency. These ceramic fillers may be used alone or in combination as a mixture of two or more of them.

It is particularly preferred to employ zircon as the low expansion ceramic filler, since the bond strength will be high.

When the water resistant glass frit of the present invention is applied for sealing PDP or for sealing VFD, it is preferred to prepare a composition comprising from 60 to 99.9 wt % of the water resistant glass frit and from 0.1 to 40 wt % of a low expansion ceramic filler powder, so that the average thermal expansion coefficient within a range of from room temperature to 250° C. after firing, would be from 60×10$^{-7}$ to 90×10$^{-7}$/° C.

In a case where the water resistant glass frit of the present invention is applied for sealing PDP or for sealing VFD, if the content of the water resistant glass frit exceeds 99.9 wt %, the amount of the low expansion ceramic filler powder tends to be small, whereby the thermal expansion coefficient after firing tends to be too high, and the thermal expansion coefficient tends to be inconsistent with the substrate glass, and a tensile stress is likely to remain at the sealing frit portion after sealing, whereby breakage is likely to occur. If the content is less than 60 wt %, the glass content tends to be small, whereby the fluidity tends to be poor, and no adequate air tightness for the sealed portion tends to be obtained as PDP or VFD.

Now, the present invention will be described in further detail with reference to Examples. However, it should be understood that the present invention is by no means restricted to such specific Examples.

EXAMPLES 1 TO 12

Raw materials were prepared and mixed in accordance with a conventional method and melted and vitrified at a temperature of from 1,000 to 1,200° C. Then, the obtained glass was subjected to water granulation or passed through rollers to obtain glass flakes. The flakes were pulverized in a ball mill for a predetermined period of time, to obtain a glass frit as identified in the column for "Glass composition" (unit: wt %) in Table 1 or 2. Examples 1 to 5 and 10 represent water resistant glass frits of the present invention, and Examples 6 to 9, 11 and 12 represent Comparative Examples.

With respect to each of the glass frits of Examples 1 to 9, the water resistance (the water resistance of a sintered body of each glass frit is hereinafter referred to as water resistance A), the glass transition point and the average thermal expansion coefficient were measured, and the results are shown in the columns for "Water resistance A", "Glass transition point" and "Average thermal expansion coefficient" in Tables 1 and 2. The methods for measuring them are as follows.

Water resistance A (unit: mg/cm$^2$): A sample powder of each glass frit was press-molded and fired for 35 minutes at a firing temperature (unit: ° C.) as identified in Table 1 or 2 and then formed into a cylindrical shape with a length of 30 mm and a diameter of 5 mm to obtain a sample. This sample was immersed in deionized water at 900C for 20 hours, whereby the weight reduction per unit surface area was measured.

Glass transition point (unit: ° C.): Measured by DTA (differential thermal analysis).

Average thermal expansion coefficient (unit: ×10$^{-7}$/° C.): 10 g of each glass frit was press-molded into a cylindrical shape with a diameter of 12.7 mm and then fired by maintaining it for 30 minutes at a firing temperature as identified in Table 1 or 2. Then, it was polished, and the elongation was measured at a temperature raising rate of 10°

C./min by a thermal expansion measuring apparatus, whereupon the average thermal expansion coefficient within a range of from room temperature to 300° C., was calculated.

From Tables 1 and 2, it is evident that Examples 1 to 5 representing water resistant glass frits of the present invention, are ones having the water resistance substantially improved, while maintaining the proper fluidity characteristic as water resistant glass frits.

On the other hand, Examples 6 to 8 represent cases where the amount of $Bi_2O_3$ is small relative to $B_2O_3$ in the glass, whereby the water resistance is inadequate, and Example 9 represents a case where the amount of $Bi_2O_3$ in the glass is too much, so that the glass transition point is high, and the fluidity is inadequate.

Then, with respect to each of Examples 1, 3, 4, 6, 8 and 10 to 12, the glass frit prepared as described above, and a low expansion ceramic filler powder were mixed in the proportions (unit: wt %) as identified in the column for "Constitution" in Table 1 or 2, to obtain a sealing composition. To evaluate the sealed portion, with respect to a sintered body of each sealing composition, the water resistance (the water resistance of the sintered body of each sealing composition will hereinafter be referred to as water resistance B) and the acid-solubility were measured, and the results are shown in Table 1 or 2. The methods for measuring them are as follows.

Water resistance B (unit: $mg/cm^2$): A sample powder of each sealing composition was press-molded, then fired under the firing conditions as identified in Table 1 or 2 and then formed into a cylindrical shape with a length of 30 mm and a diameter of 5 mm to obtain a sample. This sample was immersed in deionized water at 90° C. for 20 hours, whereby the weight reduction per unit surface area, was measured.

Acid-solubility (unit: $mg/cm^2$): A sample powder of each sealing composition was press-molded, then fired under the firing conditions as identified in Table 1 or 2 and then molded into a cylindrical shape with a length of 30 mm and a diameter of 5 mm, to obtain a sample. This sample was immersed in a 10% nitric acid solution at 40° C. for 20 minutes, whereby the weight reduction per unit surface area was measured.

A color cathode ray tube of the present invention was prepared as follows.

Namely, a sealing composition prepared as described above and a vehicle were kneaded in weight proportions of about 12:1 and, after defoaming, coated on the seal surface of a funnel glass of 25 inch type. After drying, a panel glass was set thereon, followed by firing under the firing conditions as identified in Table 1 or 2, for sealing, to obtain a bulb. With respect to the bulb, a hydraulic pressure strength test and salvage were carried out by the methods described hereinafter. The results are shown in Tables 1 and 2. Examples 1, 3, 4 and 10 represent color cathode ray tubes of the present invention, and Examples 6, 8, 11 and 12 are Comparative Examples.

Hydraulic pressure strength (unit: $kg/cm^2$): In a hydraulic pressure tank, while maintaining the interior of the bulb under atmospheric pressure, the pressure from outside by water was continuously increased, and the pressure difference at breakage was measured (an average value of five samples). To guarantee the strength as a bulb, this hydraulic pressure is usually desired to be at least 3.5 $kg/cm^2$.

Salvage: The bulb was immersed in a 10% nitric acid solution for 30 minutes to form a recess (depth: 1 to 1.5 mm) substantially uniformly all along the sealed portion. Then, the outer surface of this bulb was dipped in warm water of about 70° C. for about 5 minutes and further immersed in cold water of 35° C. to let cracking start from the recess where the stress concentrated. Then, the warm water was used again to give a heat shock to let the cracking progress to accomplish the division. "Good" represents a case where the cracking did not extend to the glass, and "No good" represents a case where the cracking extended to the glass.

From Tables 1 and 2, it is evident that the color cathode ray tubes of the present invention satisfy the acid-solubility while having the water resistance substantially improved, and thus, make it possible to re-use the glass parts. Whereas, Example 11 is a case where the acid-solubility is inadequate so that salvage can not be done, although the water resistance is satisfied, Examples 6 and 8 are cases where the water resistance is inadequate, and Example 12 is a case where the acid-solubility is inadequate, so that salvage can not be done, although there will be no environmental problem in that no lead is contained.

TABLE 1

| | | Example 1 | Example 2 | Example 3 | Example 4 | Example 5 | Example 6 |
|---|---|---|---|---|---|---|---|
| Glass composition | PbO | 63.0 | 68.0 | 55.0 | 63.7 | 52.0 | 75.0 |
| | $Bi_2O_3$ | 10.0 | 12.0 | 17.5 | 17.5 | 27.5 | 2.0 |
| | $B_2O_3$ | 7.5 | 9.0 | 6.5 | 7.3 | 7.5 | 7.0 |
| | ZnO | 17.5 | 10.0 | 18.0 | 10.0 | 11.0 | 14.0 |
| | $SiO_2$ | 2.0 | 1.0 | 1.0 | 1.5 | 1.5 | 2.0 |
| | BaO | 0 | 0 | 1.0 | 0 | | 0 |
| | SrO | 0 | 0 | 0.5 | 0 | | 0 |
| | CaO | 0 | 0 | 0.5 | 0 | 0.5 | 0 |
| Firing temperature | | 440 | 440 | 440 | 460 | 490 | 440 |
| Water resistance A | | 0 | 0.3 | 0.1 | 0.4 | 0.1 | 12.5 |
| Glass transition point | | 320 | 326 | 343 | 318 | 326 | 315 |
| Average thermal expansion coefficient | | 93 | 98 | 86 | 101 | 104 | 98 |
| Constitution | Glass | 99.5 | | 99.8 | 98.5 | | 99.0 |
| | Zircon | 0.5 | | | 0.3 | | |
| | Lead titanate | | | 0.1 | | | |
| | β-eucryptite | | | 0.1 | | | |
| | β-spodumene | | | | | 0.1 | |
| | β-quartz solid solution | | | | | 0.1 | |
| | Cordierite | | | | | | 1.0 |

TABLE 1-continued

|  |  | Example 1 | Example 2 | Example 3 | Example 4 | Example 5 | Example 6 |
|---|---|---|---|---|---|---|---|
| Firing conditions | Temperature (° C.) |  | 440 |  | 440 | 450 | 450 |
|  | Time (min.) |  | 35 |  | 40 | 30 | 40 |
| Water resistance B |  |  | 0 |  | 0.1 | 0.4 | 12.5 |
| Acid-solubility |  |  | 190 |  | 140 | 160 | 130 |
| Hydraulic pressure strength |  |  | 4.6 |  | 4.8 | 4.3 | 4.2 |
| Salvage |  |  | Good |  | Good | Good | Good |

TABLE 2

|  |  | Example 7 | Example 8 | Example 9 | Example 10 | Example 11 | Example 12 |
|---|---|---|---|---|---|---|---|
| Glass composition | PbO | 70.0 | 75.0 | 50.0 | 52.0 | 0 | 0 |
|  | $Bi_2O_3$ | 0 | 0 | 45.0 | 27.5 | 83.0 | 0 |
|  | $B_2O_3$ | 13.0 | 9.0 | 2.0 | 7.5 | 5.0 | 0 |
|  | ZnO | 15.0 | 12.0 | 0 | 11.0 | 12.0 | 3.0 |
|  | $SiO_2$ | 1.0 | 2.0 | 0 | 1.5 | 0 | 0 |
|  | BaO | 0.5 | 2.0 | 3.0 | 0 | 0 | 0 |
|  | SrO | 0 | 0 | 0 | 0 | 0 | 0 |
|  | CaO | 0.5 | 0 | 0 | 0.5 | 0 | 0 |
|  | SnO | 0 | 0 | 0 | 0 | 0 | 62.0 |
|  | $P_2O_5$ | 0 | 0 | 0 | 0 | 0 | 35.0 |
| Firing temperature |  | 440 | 440 | 440 |  |  |  |
| Water resistance A |  | 10.0 | 7.3 | 1.0 |  |  |  |
| Glass transition point |  |  | 318 | 412 |  |  |  |
| Average thermal expansion coefficient |  |  | 98 | 87 |  |  |  |
| Constitution | Glass |  | 99.0 |  | 99.5 | 85.0 | 70.0 |
|  | Zircon |  | 0.5 |  | 0.5 | 10.0 |  |
|  | Cordierite |  |  |  |  | 5.0 | 30.0 |
| Firing conditions | Temperature (° C.) |  | 440 |  | 430 | 460 | 440 |
|  | Time (min.) |  | 35 |  | 45 | 30 | 10 |
| Water resistance B |  |  | 7.3 |  | 0.1 | 0.5 | 2.0 |
| Acid-solubility |  |  | 170 |  | 155 | 60 | 10 |
| Hydraulic pressure strength |  |  | 4.0 |  | 4.1 | 4.1 | 4.9 |
| Salvage |  |  | Good |  | Good | No good | No good |

According to the present invention, by properly balancing the respective components, it is possible to obtain a lead-containing glass with a small amount of elution of lead without substantially reducing the content of B2O3. This glass is suitable for forming various coating films or for sealing a cathode ray tube, PDP, VFD, etc.

Further, according to the present invention, a proper degree of erosion by an acid is secured for the sealed portion of glass for a cathode ray tube, and the amount of elution of lead in water is controlled at the same time, so that it is possible to provide a color cathode ray tube, whereby re-division can be carried out without breakage, and an environmental problem due to elution of lead can be prevented.

What is claimed is:

1. A color cathode ray tube having a panel glass and a funnel glass sealed with a composition comprising a low melting glass containing PbOB$_2$O$_3$, B$_2$O$_3$ and ZnO and having a weight ratio of PbO/B$_2$O$_3$≦9 and a weight ratio of ZnO/B$_2$O$_3$>1, wherein the sealed portion is such that the weight reduction after being immersed in water at 90° C. for 20 hours, is at most 1 mg/cm$^2$, and the weight reduction after being immersed in a 10% nitric acid solution at 40° C. for 20 minutes, is from 80 to 700 mg/cm$^2$.

2. The color cathode ray tube according to claim 1, wherein the composition constituting the sealed portion, consists essentially of from 80 to 99.9 wt % of a low melting glass powder and from 0.1 to 20 wt % of a low expansion ceramic filler powder, wherein the low melting glass contains PbO, Bi2O3, B2O3 and ZnO with a weight ratio of ZnO/B2O3>1 and a weight ratio of Bi2O3/B2O3>1.

3. The color cathode ray tube according to claim 2, wherein the low melting glass powder consists essentially of the following components:

| PbO | 50 to 70 wt %, |
|---|---|
| $Bi_2O_3$ | 5 to 40 wt %, |
| $B_2O_3$ | 5 to 15 wt %, |
| ZnO | 5 to 30 wt %, |
| $SiO_2$ | 0 to 10 wt %, |
| BaO | 0 to 5 wt %, |
| SrO | 0 to 5 wt %, |
| CaO | 0 to 5 wt %, |
| $V_2O_5$ | 0 to 0.5 wt %, | with a weight ratio of $Bi_2O_3/B_2O_3>1$, a weight ratio of $PbO/Bi_2O_3≦8$, and a weight ratio of $PbO/ZnO≦8$.

4. A water resistant glass frit consisting essentially of the following components:

| PbO | 50 to 70 wt %, |
|---|---|
| $Bi_2O_3$ | 5 to 40 wt %, |
| $B_2O_3$ | 5 to 15 wt %, |
| ZnO | 5 to 30 wt %, |
| $SiO_2$ | 0 to 10 wt %, |

-continued

| | |
|---|---|
| BaO | 0 to 5 wt %, |
| SrO | 0 to 5 wt %, |
| CaO | 0 to 5 wt %, |
| $V_2O_5$ | 0 to 0.5 wt %, | with a weight ratio of $PbO/B_2O_3 \leqq 9$, a weight ratio of $ZnO/B_2O_3 \leqq 1$, a weight ratio of $Bi_2O_3/B_2O_3 \leqq 1$, a weight ratio of $PbO/Bi_2O_3 \leqq 8$, and a weight ratio of $PbO/ZnO \leqq 8$.

5. The water resistant glass frit according to claim 4, which is characterized in that the weight reduction after being immersed in water at 90° C. for 20 hours, is at most 1 mg/cm².

6. The water resistant glass frit according to claim 4, which consists essentially of the following components:

| | |
|---|---|
| PbO | 50 to 70 wt %, |
| $Bi_2O_3$ | 5 to 38 wt %, |
| $B_2O_3$ | 6 to 15 wt %, |
| ZnO | 5 to 30 wt %, |
| $SiO_2$ | 0.5 to 5 wt %, |
| BaO | 0 to 5 wt %, |
| SrO | 0 to 5 wt %, |
| CaO | 0 to 5 wt %, |
| $V_2O_5$ | 0 to 0.5 wt %. |

* * * * *